United States Patent
Singer et al.

(10) Patent No.: US 10,707,759 B2
(45) Date of Patent: Jul. 7, 2020

(54) BOOSTING BATTERY VOLTAGE WITH BOOST CONVERTERS

(71) Applicant: INTERNATIONAL BUSINESS MACHINES CORPORATION, Armonk, NY (US)

(72) Inventors: Noah B. Singer, Rockland, NY (US); Steven J. Ahladas, Highland, NY (US); Brian C. Tucker, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/866,577

(22) Filed: Jan. 10, 2018

(65) Prior Publication Data
US 2019/0214909 A1  Jul. 11, 2019

(51) Int. Cl.
*H02M 3/158* (2006.01)
*H02H 7/12* (2006.01)
(Continued)

(52) U.S. Cl.
CPC .......... *H02M 3/1582* (2013.01); *H02H 3/243* (2013.01); *H02H 7/1213* (2013.01);
(Continued)

(58) Field of Classification Search
CPC .......... H02M 1/32; H02M 3/04; H02M 7/217; H02M 7/48; H02M 7/04; H02M 3/158; H02M 3/1582; H02M 7/219; H02M 2001/0003; H02H 3/243; H02H 7/1213; H02J 7/02; H02J 7/04; H02J 7/042;
(Continued)

(56) References Cited

U.S. PATENT DOCUMENTS 4,827,151 A * 5/1989 Okado ................ H02M 1/4208
307/66
7,432,617 B2  10/2008 Kanouda
(Continued)

FOREIGN PATENT DOCUMENTS

CN   102497095 A   6/2012
EP    2333930 A3   6/2011

OTHER PUBLICATIONS

L.A. Flores et al., "Isolated DC-DC UPS based in a forward-forward converter analysis and design", IEEE, 2008, pp. 802-807.
(Continued)

*Primary Examiner* — Gustavo A Rosario-Benitez
(74) *Attorney, Agent, or Firm* — Cantor Colburn LLP; Tihon Poltavets

(57) ABSTRACT

Systems and methods for boosting battery voltage with boost converters are provided. Aspects include coupling a discharge path of a battery to an input side of a power converter in a power supply, wherein the power supply comprises a rectifier and the power converter. A charge path of the battery is coupled to an output side of the power converter and a processor monitors an output voltage of the power converter. The processor also monitors an input voltage of the power converter and responsive to the output voltage of the power converter dropping below a threshold voltage, the processor enables the discharge path.

16 Claims, 5 Drawing Sheets

(51) Int. Cl.
*H02J 9/06* (2006.01)
*H02H 3/24* (2006.01)
*H02J 7/02* (2016.01)
*H02M 3/156* (2006.01)
*H02M 1/00* (2006.01)

(52) U.S. Cl.
CPC ............... *H02J 7/022* (2013.01); *H02J 9/06* (2013.01); *H02M 3/156* (2013.01); *H02M 2001/007* (2013.01)

(58) Field of Classification Search
CPC .. H02J 7/045; H02J 7/025; H02J 7/007; H02J 7/0068; H02J 7/0052; H02J 2007/10; H02J 2007/105; H02J 9/06
See application file for complete search history.

(56) References Cited

U.S. PATENT DOCUMENTS

| | | | |
|---|---|---|---|
| 7,548,041 B2* | 6/2009 | Zemke | H02J 7/0068 320/128 |
| 8,159,361 B2 | 4/2012 | Rodriguez-Ferre | |
| 8,450,980 B2 | 5/2013 | Kumar | |
| 8,957,542 B2 | 2/2015 | Dighrasker | |
| 9,065,277 B1* | 6/2015 | Kim | H02J 7/0021 |
| 9,106,092 B2 | 8/2015 | Park et al. | |
| 9,373,977 B1 | 6/2016 | Kim | |
| 9,444,280 B2 | 9/2016 | Lee | |
| 2009/0103341 A1* | 4/2009 | Lee | B60W 10/26 363/124 |
| 2011/0121653 A1* | 5/2011 | Hartular | H02J 1/10 307/66 |
| 2015/0380968 A1* | 12/2015 | Lee | H02J 9/061 713/300 |
| 2017/0126028 A1 | 5/2017 | Kang | |
| 2017/0142656 A1* | 5/2017 | Hong | H04W 52/0229 |

OTHER PUBLICATIONS

International Search Report; International Application No. PCT/IB2019/050127; International Filing Date: Jan. 8, 2019; dated Feb. 28, 2019; 9 pages.

* cited by examiner

BOOSTING BATTERY VOLTAGE WITH BOOST CONVERTERS

BACKGROUND

The present invention generally relates to battery backup power supplies, and more specifically, to boosting battery voltage with boost converter.

Data operations (data processing, management, analysis, etc.) have become a key component of modern business and in industries from banking to online retail and from insurance to airlines. Often, these data operations are critical to the operation of the company and any downtime can lead to losses of millions or billions of dollars in revenue. Businesses use large IT equipment (such as, but not limited to, the mainframe) to perform these data operations and since the operations are mission critical, the IT equipment itself is mission critical and must not experience downtime.

Large IT equipment in a data center environment is run off of main power lines. In the event of a loss of power from the main line, backup generators will turn on to continue providing power to the data center and to all of the IT equipment contained within. However, there can be a lag time between the loss of the main line power and the start of the generators during which the IT equipment will not be functioning. For mission critical applications and IT equipment this lag time is unacceptable so mission critical IT equipment will have an battery backup system to ensure that the system always has a source of power, even during the time between a failure of the main line power and the start of the generator (typically 30 seconds or less).

SUMMARY

Embodiments of the present invention are directed to a power supply. A non-limiting example of the power supply includes a rectifier circuit comprising an rectifier input bus and a rectifier output bus and a power converter circuit comprising a power converter input bus and a power converter output. The power supply includes a battery comprising a discharge path and a charge path, wherein the discharge path is electronically coupled to the input bus of the power converter circuit, and wherein the charge path is electronically coupled to the output bus of the power converter circuit. The power supply also includes a microcontroller configured to operate the power supply in three modes, wherein the three modes comprise: a power supply mode, a battery backup mode, and a battery charge mode.

Embodiments of the present invention are directed to a method for boosting battery voltage. A non-limiting example of the method includes coupling a discharge path of a battery to an input side of a power converter in a power supply, wherein the power supply comprises a rectifier and the power converter. A charge path of the battery is coupled to an output side of the power converter and a processor monitors an output voltage of the power converter. The processor also monitors an input voltage of the power converter and responsive to the output voltage of the power converter dropping below a threshold voltage, the processor enables the discharge path.

Embodiments of the present invention are directed to a power supply. A non-limiting example of the power supply includes a power converter circuit comprising a power converter input bus and a power converter output. The power supply includes a battery comprising a discharge path and a charge path, wherein the discharge path is electronically coupled to the input bus of the power converter circuit, and wherein the charge path is electronically coupled to the output bus of the power converter circuit. The power supply also includes a microcontroller configured to operate the power supply in three modes, wherein the three modes comprise: a power supply mode, a battery backup mode, and a battery charge.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
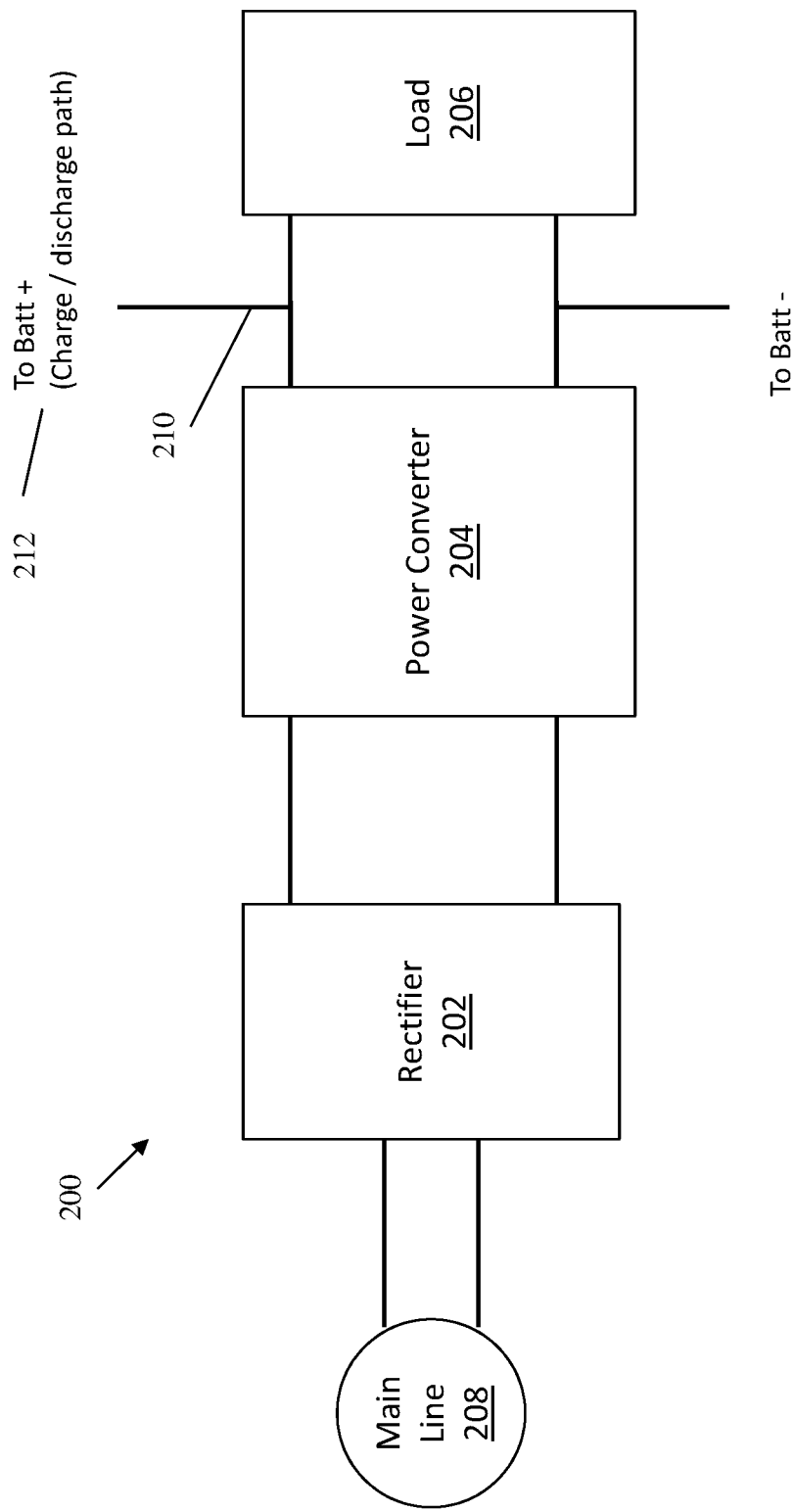
FIG. 1 depicts a block diagram of a power supply with a battery backup according to one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, large IT equipment often uses high-voltages inside the power assemblies for efficiency purposes. When the main line goes down, the battery backup needs to provide high-voltage power to the power assemblies (i.e., inside the regulator/converter assembly) to keep the system running.

In order for the battery backup to provide the high-voltage power necessary to keep the system up and running, a large number of battery cells (e.g., lead acid, lithium ion, etc.) need to be connected in series. The reason for this is that individual cell voltages can be quite low (~1-4 V per cell depending on chemistry) while the battery backup needs to provide high-voltages (~200-400 V). Putting a large number of cells in series can be expensive and heavy.

Often, the capacity required to meet holdup requirements can be met with a much smaller number of cells than required to meet the battery stack voltage requirements. Therefore, using a large number of cells to reach a certain high stack voltage can be costly and inefficient in terms of capacity being wasted.

For example, FIG. 1 depicts a block diagram of a power supply with a battery backup. The power supply 200 includes a main line 208 power source, a rectifier circuit 202, a power converter 204, and a load 206 for the power supply 200. The battery discharge path 212 is electronically coupled to the intermediate bus 210 that is coupled to the output of the power converter 204 and the input of the load 206. The charge path and the discharge path for the battery backup are coupled to the intermediate bus 210 between the power converter 204 output and the load 206 input. The discharge path 212 is located at the output of the power converter 204 which requires the battery stack to produce the required voltage for the load 206 upon power failure.

Turning now to an overview of the aspects of the invention, one or more embodiments of the invention address the above-described shortcomings of the prior art by providing a method for reducing the cell count of the battery stack (thus saving money and reducing weight) while not altering the regulator/converter assembly architecture to accommodate a lower stack voltage.

The above-described aspects of the invention address the shortcomings of the prior art by utilizing the frequently available boost converter in the regulator/converter assembly to boost the voltage the load sees from the battery stack. This allows the battery stack to contain fewer cells (reducing cost and weight) with the limits now being the boost input parameters and the desired holdup time (capacity) rather than the load voltage requirements. This is accomplished by connecting the positive side of the battery stack to the input side of the boost converter instead of the output side of the boost converter which is also called the intermediate bus. The intermediate bus is the load of the boost converter/battery backup and is also the input for the final stage DC/DC converter.

Figure 2:
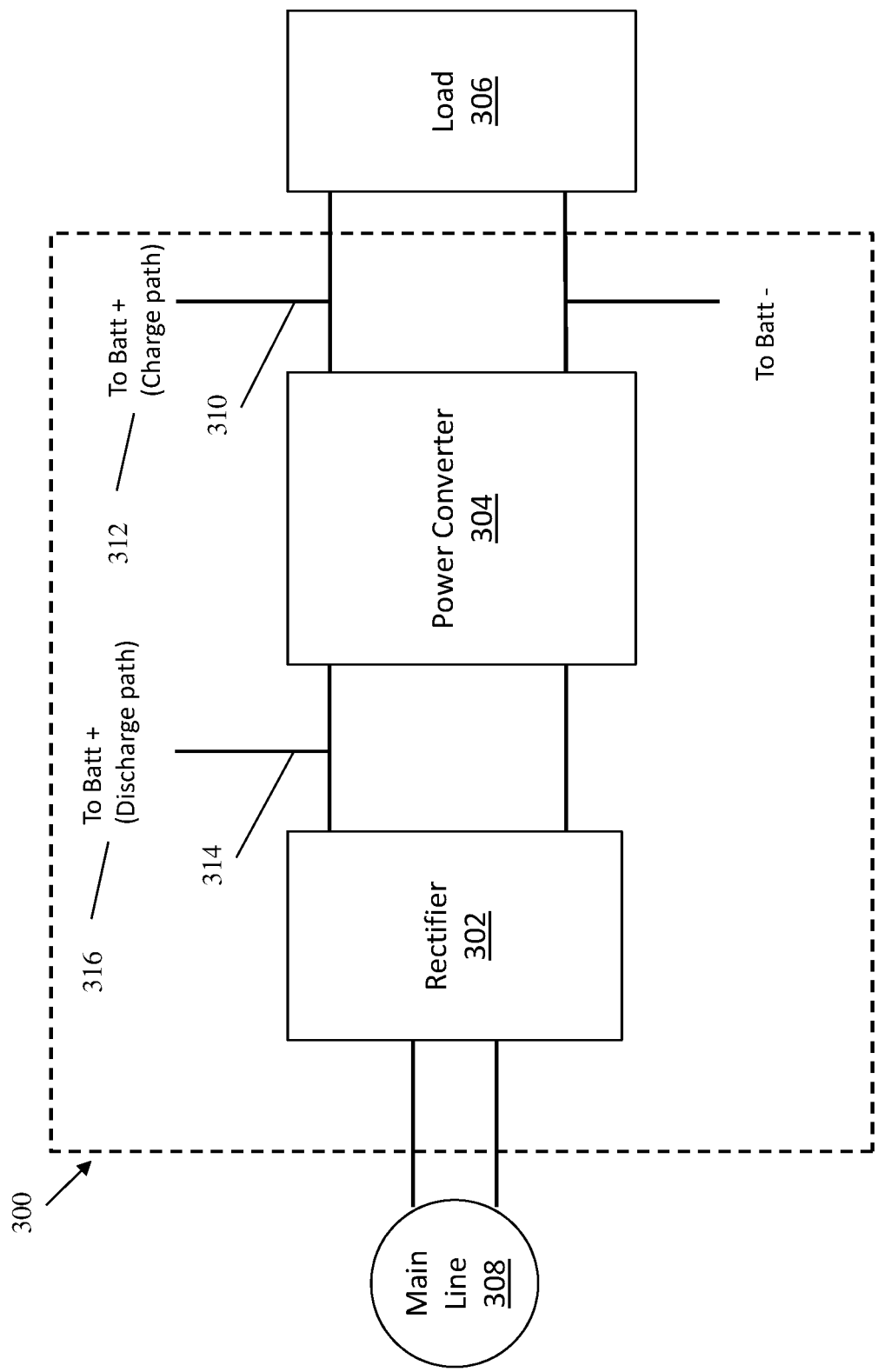
FIG. 2 depicts a block diagram of a power supply with a battery backup with a battery boost according to one or more embodiments of the invention.
Figure 3:
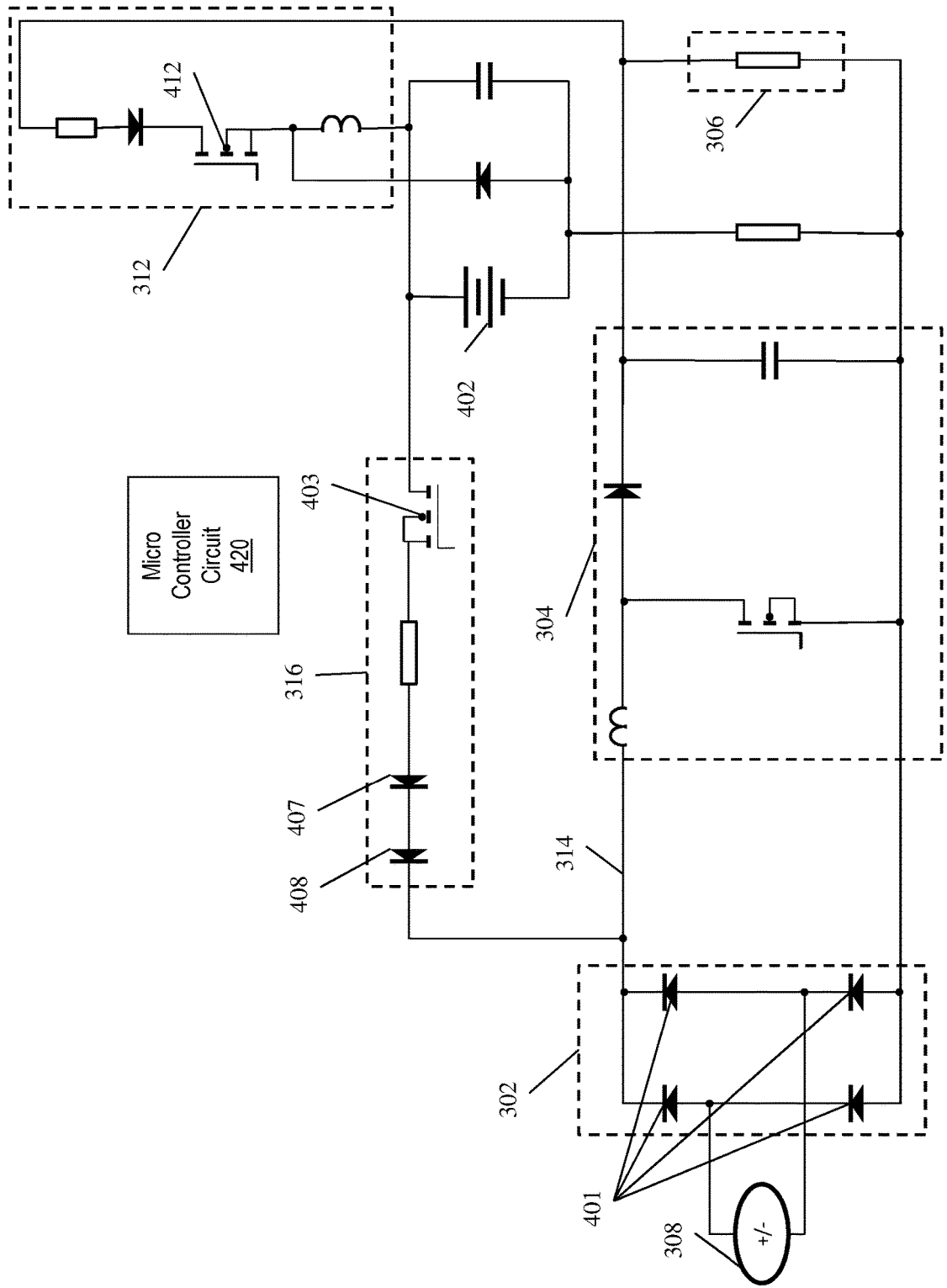
FIG. 3 depicts a circuit diagram of a power supply with a battery backup with a battery boost according to one or more embodiments of the invention.

Turning now to a more detailed description of aspects of the present invention, FIG. 3 depicts a block diagram of a power supply boosting battery voltage with a power converter according to one or more embodiments of the present invention, FIG. 2 depicts a block diagram of a power supply with a battery backup. The power supply 300 includes a rectifier 302 circuit electronically coupled to a main line 308 power source. The power supply 300 also includes a power converter 304 electronically coupled to the rectifier 302 circuit and to a load 306. The power supply 300 utilizes the power converter 304 in the power supply 300 to boost the voltage the load 306 sees from a battery stack. In an embodiment, the power converter 304 is a boost converter. The rectifier 302 can be any type rectifier including, but not limited, to, a bridge rectifier. In one or more embodiments of the invention, the output bus 310 of the power converter 304 is coupled to the charge path 312 for the battery. The input bus 314 of the power converter 304 is coupled to the discharge path 316 of the battery. The power supply 300 can be coupled to a main line 308 power supply such as, for example, a mains power line. A load 306 for the power supply 300 can be coupled to the output bus 310 of the power converter 304.

FIG. 3 depicts a circuit diagram of a power supply boosting battery voltage with a power converter according to one or more embodiments of the invention. The power supply includes a rectifier 302 circuit connected to a power converter 304 circuit connected to a load 306. The rectifier 302 is also connected to a main line 308. The input bus to the power converter 304 is connected to a discharge path 316 of the battery 402. The output bus for the power converter 304 is connected to the charge path 312 of the battery 402.

In one or more embodiments of the invention, a microcontroller 420 operates the power supply in three modes depending on the state of the main power line 308. The microcontroller 420 can be any type of controller such as a processor. The three modes are normal operation (e.g., power supply mode), power outage (e.g., battery backup mode), and return to normal operation from power outage (e.g., battery charge mode).

In one or more embodiments of the invention, during normal operation, the power converter 304 operates as an alternating current to direct current (DC/DC) converter, and the rectifier 302 receives an input alternating current (AC) sine wave from the main line 308 and outputs a direct current to the input of the power converter 304. In some embodiments, the power converter 304 can operate as a direct current to direct current (DC/DC) converter. The power converter 304 outputs a regulated voltage on the load 306. The microcontroller 420 senses the voltage output from the power converter 304 on the load 306 and turns off (disables) the discharge path 316 for the battery 402. During normal operation, cathode voltages of the diodes 401 on the output side of the rectifier 302 are greater than the battery 402 voltage. To prevent reverse flow up the discharge path 316 and back into the battery 402, diodes 407, 408 are placed in the discharge path. Uninhibited current flow into the battery 402 along this discharge path 316 could result in failure of the battery which is why diodes 407, 408 are utilized in the discharge path 316.

In one or more embodiments of the invention, in the event that the battery 402 voltage is in the discharged state (for example, after the battery backup unit has provided holdup to the power supply in the event of a main line 308 power loss), the microcontroller 420 directs the charge path 312 to the appropriate current of voltage regulation point. The charge path, as configured, is capable of relatively high charge rates with little dissipation. When the battery 402 is recharged to the appropriate voltage level, the microcontroller 420 turns the charge path off by utilizing the charge switch 412 and turning the switch to an off position. The charge switch 412 can be any type of switch including, but not limited to, a transistor.

In one or more embodiments of the present invention, the power outage mode is when the microcontroller 420 in the battery senses the regulated output voltage of the power converter 304. When the output voltage drops below a threshold voltage, the microcontroller 420 senses the drop and turns on the discharge path 316 by turning on the discharge switch 403. The discharge switch 403 can be any type of switch including, but not limited to, a transistor. When the discharge path 316 is enabled the diodes 401 in the rectifier, in most instances, will be reversed biased, as the battery 402 voltage is greater than the line 314 voltage. At this point, the battery 402 is connected to the input of the power converter 304 through the discharge path 316 and a regulated voltage is provided on the load 306. The voltage on the load 306 remains regulated as the battery 402 discharges. If the point of maximum discharge of the battery 402 is selected to be at the lower limit of the power converter 304 then the power supply does not need to be overdesigned.

In one or more embodiments of the invention, in the return to normal operation from power outage mode, when the main line 308 voltage comes back while running on the battery 402 backup, the rectifier 302 output will exceed the battery 402 voltage at the peak of the line 314. This will cause the discharge current of the battery 402 to pulse at the line frequency. The microcontroller 420 will sense this pulse and will disconnect the battery 402 discharge path 316 (opening switch 403).

In one or more embodiments of the invention, the battery 402 can be any type of battery including, but not limited to, a battery stack.

Figure 4:
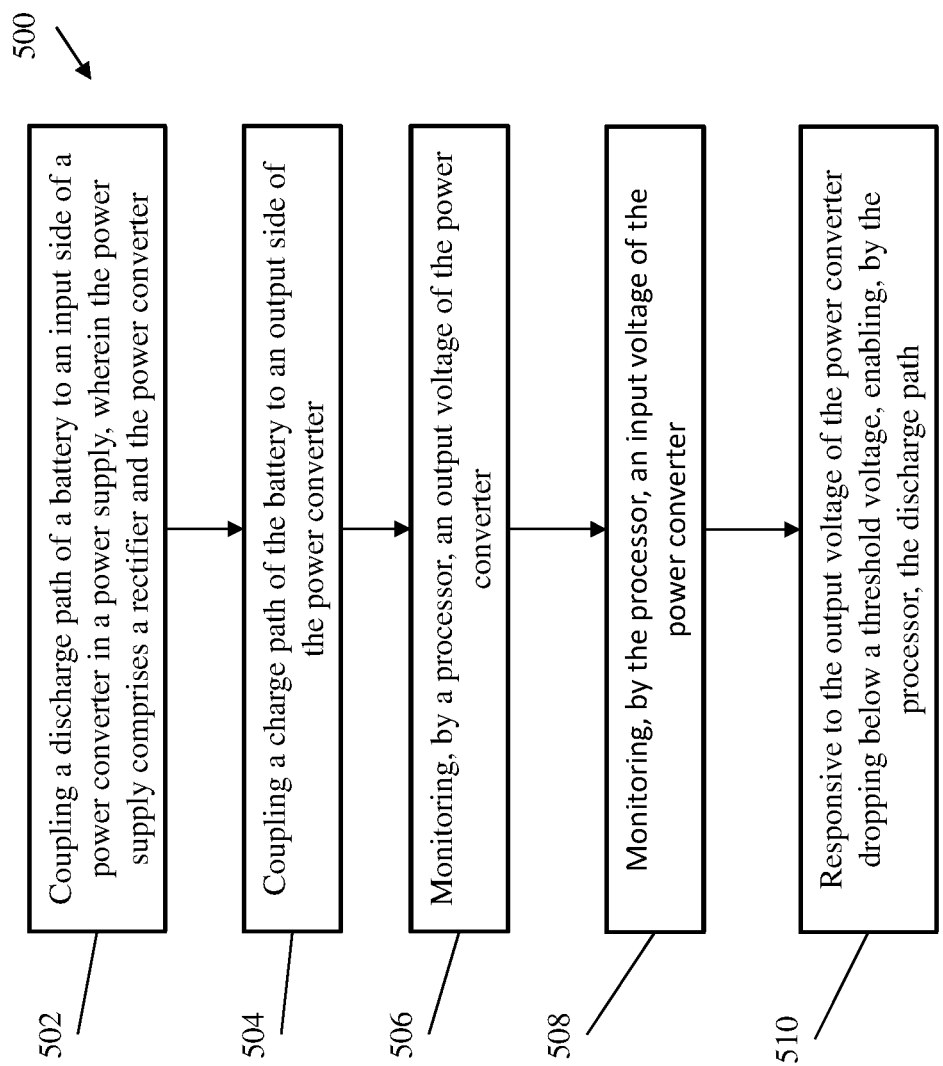
FIG. 4 depicts a flow diagram of a method for boosting battery voltage according to one or more embodiments of the invention.

FIG. 4 depicts a flow diagram of a method for boosting battery voltage according to one or more embodiments of the invention. The method 500 includes coupling a discharge path of a battery to an input side of a power converter in a power supply, wherein the power supply comprises a rectifier and the power converter, as shown in block 502. At block 504, the method 500 includes coupling a charge path of the battery to an output side of the power converter. The method 500, at block 506, includes monitoring, by a processor, an output voltage of the power converter. Also, the method 500 includes monitoring, by the processor, an input voltage of the power converter, as shown at block 508. And responsive to the output voltage of the power converter dropping below a threshold voltage, the method 500, at block 510, includes enabling, by the processor, the discharge path.

Additional processes may also be included. It should be understood that the processes depicted in FIG. 4 represent illustrations, and that other processes may be added or existing processes may be removed, modified, or rearranged without departing from the scope and spirit of the present disclosure.

Figure 5:
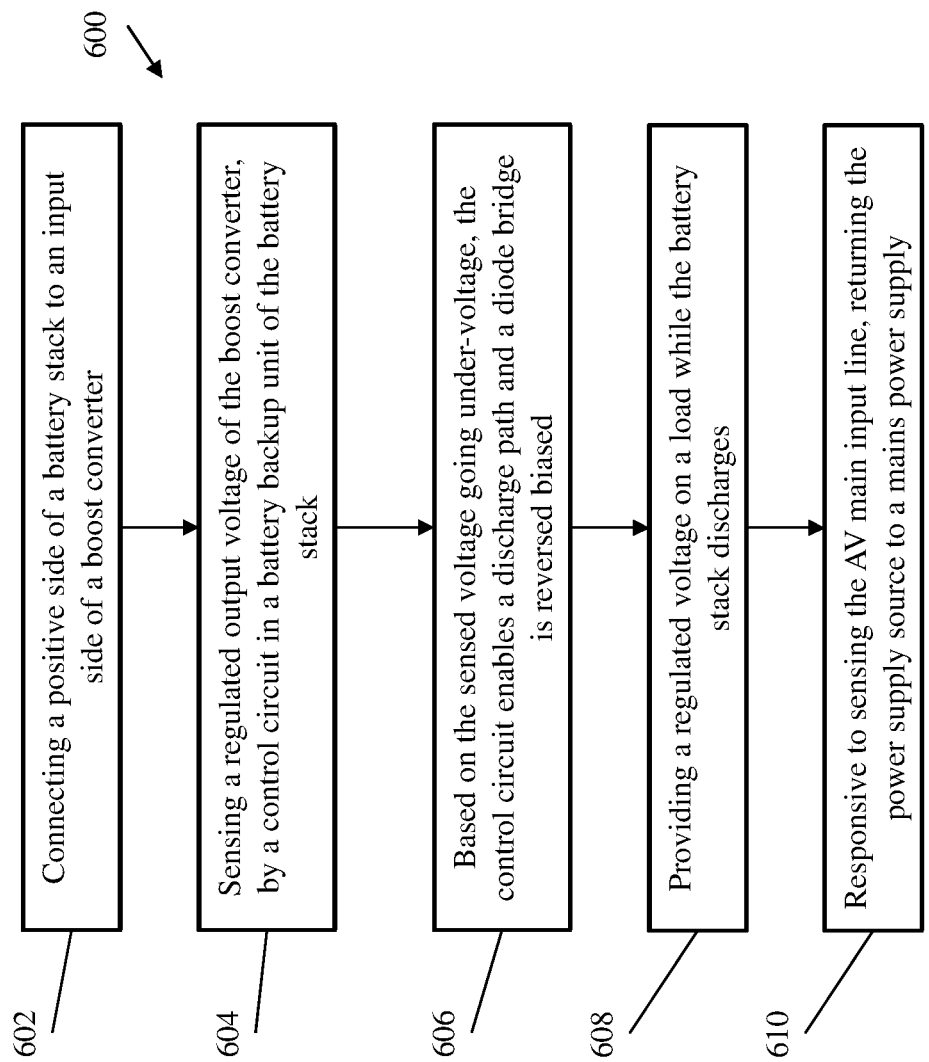
FIG. 5 depicts a flow diagram of an alternate method for boosting battery voltage according to one or more embodiments of the invention.

FIG. 5 depicts a flow diagram of an alternate method for boosting battery voltage according to one or more embodiments of the invention. The method 600 includes connecting a positive side of a battery stack to an input side of a boost converter, as shown at block 602. The battery stack can be connected to a battery backup discharge path. The method 600, at block 604, includes sensing a regulated output voltage of the boost converter, by a control circuit in a battery backup unit of the battery stack At block 606, the method 600 includes based on the sensed voltage going under-voltage, the control circuit enables a discharge path and a diode bridge is reversed biased. The sensed voltage going under-voltage can occur due to a power failure (e.g., main power line failure). The method 600 includes providing a regulated voltage on a load while the battery stack discharges, as shown at block 608. The load is the final stage of the boost converter. Additionally, the battery has a separate discharge path and charge path and the battery is charged from the output of the boost converter during normal operations mode. In one or more embodiments, an active switch can control when the battery is discharging. In one or more embodiments, rectifiers in the discharge path are utilized to prevent a main line input voltage from entering the battery stack. The method 600 includes sensing main line input voltage and returning the power supply source to the main line, as shown in block 610.

Additional processes may also be included. It should be understood that the processes depicted in FIG. 5 represent illustrations and that other processes may be added or existing processes may be removed, modified, or rearranged without departing from the scope and spirit of the present disclosure.

Technical benefits include reducing the cell count inside a battery because of the effect of the power converter boosting the voltage supplied to a load. The reduction in cell count also reduces the weight and cost of a battery. The reduced cell count and weight allow for smaller packaging of the power supply which also contributes to smaller weight and lower cost. Also, the reduction in weight allows for easier service and replacement of battery backups.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A power supply comprising:
   a rectifier circuit comprising a rectifier input bus and a rectifier output bus;
   a power converter circuit comprising a power converter input bus and a power converter output bus, wherein the rectifier output bus is electronically coupled to the power converter input bus, and wherein the power converter output bus is electronically coupled to a load;
   a battery comprising a discharge path and a charge path, wherein the discharge path is electronically coupled to the input bus of the power converter circuit and the rectifier output bus, wherein the charge path is electronically coupled to the output bus of the power converter circuit, wherein the discharge path includes a diode that electronically couples the battery to the rectifier output bus, and wherein the charge path includes a charge switch;
   a microcontroller configured to operate the power supply in three modes, wherein the three modes comprise:
      a power supply mode;
      a battery backup mode; and
      a battery charge mode;
   wherein the microcontroller operates the power supply in power supply mode while sensing a voltage output at the power converter output bus;
   wherein during the power supply mode, the discharge path for the battery is disabled based on determining the battery is charged to an appropriate voltage level;
   wherein during the power supply mode, the charge path for the batter is disabled by operating, by the microcontroller, the charge switch in an off state; and
   wherein the battery charge mode comprises:
   responsive to sensing one or more pulses on a discharge current for the battery, disabling, by the microcontroller, the discharge path for the battery, wherein the one or more pulses pulse the discharge path of the battery at a line frequency of the discharge path of the battery.

2. The power supply of claim 1, wherein the discharge path for the battery is disabled by turning a switch in the discharge path off.

3. The power supply of claim 1, wherein the battery backup mode comprises:
   responsive to sensing a voltage output at the power converter output bus below a threshold voltage, enabling, by the microcontroller, the discharge path of the battery.

4. The power supply of claim 3, wherein enabling, by the microcontroller, the discharge path of the battery comprises:
   turning a switch in the discharge path on.

5. The power supply of claim 1, wherein the rectifier input bus is electronically coupled to a mains power supply.

6. The power supply of claim 1, wherein the power converter circuit is a boost converter.

7. The power supply of claim 1, wherein the battery is a battery stack.

8. The power supply of claim 1, wherein the discharge path comprises one or more diodes.

9. A method for boosting battery voltage, the method comprising:
   coupling a discharge path of a battery to an input side of a power converter in a power supply, wherein the power supply comprises a rectifier and the power converter, wherein the discharge path includes a diode that electronically couples the battery to the rectifier output bus, wherein the input side of the power converter is electronically coupled to an output of the rectifier, and wherein the charge path includes a charge switch;
   coupling an output side of the power converter to a load;
   coupling a charge path of the battery to an output side of the power converter;
   monitoring, by a processor, an output voltage of the power converter;
   monitoring, by the processor, an input voltage of the power converter;
   responsive to the output voltage of the power converter dropping below a threshold voltage, enabling, by the processor, the discharge path;
   responsive to sensing the input voltage of the power converter, responsive to determining that the battery is charged to an appropriate voltage level, and responsive to sensing one or more pulses on a discharge current for the battery:
   disabling, by the processor, the discharge path; and
   disabling the charge path by operating, by the processor, the charge switch in an off state, wherein the one or more pulses pulse the discharge path of the battery at a line frequency of the discharge path of the battery.

10. The method of claim 9, wherein enabling, by the processor, the discharge path comprises;
    turning a switch in the discharge path on.

11. The method of claim 9, wherein disabling, by the processor, the discharge path comprises;
    turning a switch in the discharge path off.

12. The method of claim 9, wherein the power converter is a boost converter.

13. A power supply comprising:
    a power converter circuit comprising a power converter input bus and a power converter output bus;
    a battery comprising a discharge path and a charge path, wherein the discharge path is electronically coupled to the input bus of the power converter circuit, wherein the charge path is electronically coupled to the output bus of the power converter circuit, wherein the discharge path includes a diode that electronically couples the battery to the power converter input bus, wherein the power converter output bus is electronically coupled to a load, and wherein the charge path includes a charge switch;
    a microcontroller configured to operate the power supply in three modes, wherein the three modes comprise:
       a power supply mode;
       a battery backup mode; and
       a battery charge mode;
    wherein the microcontroller operates the power supply in power supply mode while sensing a voltage output at the power converter output bus;
    wherein during the power supply mode, the discharge path for the battery is disabled based on determining the battery is charged to an appropriate voltage level; and
    wherein during the power supply mode, the charge path for the batter is disabled by operating, by the microcontroller, the charge switch in an off state; and
    wherein the battery charge mode comprises:
    responsive to sensing one or more pulses on a discharge current for the battery, disabling, by the microcontroller, the discharge path for the battery, wherein the one or more pulses pulse the discharge path of the battery at a line frequency of the discharge path of the battery.

14. The power supply of claim 13, wherein the discharge path for the battery is disabled by turning a switch in the discharge path off.

15. The power supply of claim 13, wherein the battery backup mode comprises:
- responsive to sensing a voltage output at the power converter output bus below a threshold voltage, enabling, by the microcontroller, the discharge path of the battery.

16. The power supply of claim 15, wherein enabling, by the microcontroller, the discharge path of the battery comprises:
- turning a switch in the discharge path on.

\* \* \* \* \*